United States Patent [19]
Odachi et al.

[11] Patent Number: 6,094,995
[45] Date of Patent: Aug. 1, 2000

[54] TORQUE SENSOR USING POWER MEASUREMENT

[75] Inventors: Yasuharu Odachi; Katsufumi Tanaka, both of Kariya, Japan

[73] Assignees: Kabushiki Kaisha Toyoda; Jidoshokki Seisakusho, both of Aichi-Ken, Japan

[21] Appl. No.: 09/141,309

[22] Filed: Aug. 27, 1998

[30] Foreign Application Priority Data

Aug. 29, 1997 [JP] Japan .................................. 9-234716
Aug. 3, 1998 [JP] Japan ................................. 10-219053

[51] Int. Cl.[7] ....................................................... G01L 3/02
[52] U.S. Cl. ................................. 73/862.333; 73/862.193
[58] Field of Search ....................... 73/862.193, 862.332, 73/862.333

[56] References Cited

U.S. PATENT DOCUMENTS

| | | | |
|---|---|---|---|
| 4,414,855 | 11/1983 | Iwasaki | 73/862.335 |
| 4,506,554 | 3/1985 | Blomkvist et al. | 73/862.335 |
| 4,811,609 | 3/1989 | Nishibe et al. | 73/862.333 |
| 4,833,926 | 5/1989 | Todoroki et al. | 73/862.041 |
| 4,873,874 | 10/1989 | Sobel | 73/862.333 |

FOREIGN PATENT DOCUMENTS

| | | |
|---|---|---|
| 58-140655 | 8/1983 | Japan . |
| 60-50429 | 3/1985 | Japan . |
| 3229121 | 10/1991 | Japan . |

*Primary Examiner*—Max Noori
*Attorney, Agent, or Firm*—Morgan & Finnegan, L.L.P.

[57] ABSTRACT

A torque sensor attached to a shaft for detecting torque applied on the shaft is disclosed. The torque sensor of the present invention includes a magnetic portion attached on the shaft and a retainer arranged to surround the magnetic portion and supported to rotate with respect to the magnetic portion. A first coil supported in the retainer to surround the magnetic portion forms a first magnetic circuit passing through the magnetic portion. A power source applies an alternating current to the first coil. A measuring circuit measures torque applied on the shaft based on an alternating current and an alternating current. The alternating current flows in the first coil when the alternating voltage is applied.

30 Claims, 6 Drawing Sheets

TORQUE SENSOR USING POWER MEASUREMENT

BACKGROUND OF THE INVENTION

1. Field of the Invention

The present invention relates to a torque sensor attached on a shaft, more specifically, to a torque sensor for detecting a torque applied on the shaft using magnetostrictive properties.

2. Description of the Prior Art

Many torque sensors are either a magnetostriction type, which uses the changes of magnetic property caused by strain, or an inductance type, which uses the changes of magnetic property caused by stress. As shown, for example, in Japanese Unexamined Patent Publication No. 5-118938, 59-77326, these conventional sensors have two kinds of coils for detecting a torque applied on the shaft, that is, an excitation coil and a detection coil.

The conventional torque sensors have, for example, a construction shown in FIG. 8. A shaft 53 is rotatably supported in a housing 51 by bearings 52. A magnetostrictive member 54 for sensing torque is attached on the periphery of the shaft 53. A cylinder 55 is arranged inside the housing 51 and spaced apart by a predetermined distance from the periphery of the magnetostrictive member 54. Excitation coils 56 and detection coils 57 are fitted in grooves on the inner surface of the cylinder 55. When an alternating current flows in the excitation coil 56, the coil 56 generates a magnetic flux. The flux forms a magnetic circuit passing through the cylinder 55 and the magnetostrictive member 54. The magnetic circuit induces an electromotive force in the detection coil 57.

The magnetostrictive member 54 has two portions divided axially along the shaft 53. Grooves 54a inclined forty-five degrees with respect to the axis of the shaft 53 are formed on one portion, and grooves 54a inclined minus forty-five degrees are formed on the other portion. When a torque is applied to the shaft 53, a tensile force acts on one portion and a compressive force acts on the other portion, straining each portion slightly. Permeability in each portion varies according to the strain. The changes of permeability change the flux passing through the magnetostrictive member 54. Electromotive force is induced in each detection coil 57 according to the changes of flux in each portion of the magnetostrictive member 54.

FIG. 9 shows an electric circuit of conventional torque sensors. The excitation coils 56 are connected to an alternating current power source 58. The detection coils 57 are connected to a controller 59. The controller 59 includes a processing circuit 60, an A/D converter 61, and a microcomputer 62. The processing circuit 60 includes a differential circuit and a rectifier circuit. The microcomputer includes a CPU 63. A signal based on the electromotive force induced by each detection coil 57 is used in the differential circuit of the processing circuit 60 for subtraction. A signal obtained by the subtraction is rectified in the rectifier circuit and input in the CPU 63 through the A/D converter 61. The CPU 63 calculates torque applied on the shaft using the input signal. In this way, conventional torque sensors have a complicated construction requiring the excitation coil 56 and the detection coil 57.

SUMMARY OF THE INVENTION

A first objective of the present invention is to provide a torque sensor capable of detecting torque using an excitation coil alone. A second objective is to provide a torque sensor capable of using a direct current power source. A third objective is detecting torque using a digital circuit.

To achieve the above objectives, the present invention provides a torque sensor attached on a shaft to detect torque applied on the shaft. A magnetic portion is attached on the shaft. A retainer is arranged around the magnetic portion and rotatably supported with respect to the magnetic portion. A pair of coils, which is supported in a stator and faces the magnetic portion, forms a pair of magnetic circuits passing through the magnetic portion. A power source applies a voltage to each coil. A measurement circuit measures torque applied on the shaft, based on current, which flows in each coil excited by the applied voltage, and the voltage.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

A first embodiment of the present invention will now be described in reference to FIGS. 1–3.

Figure 1:
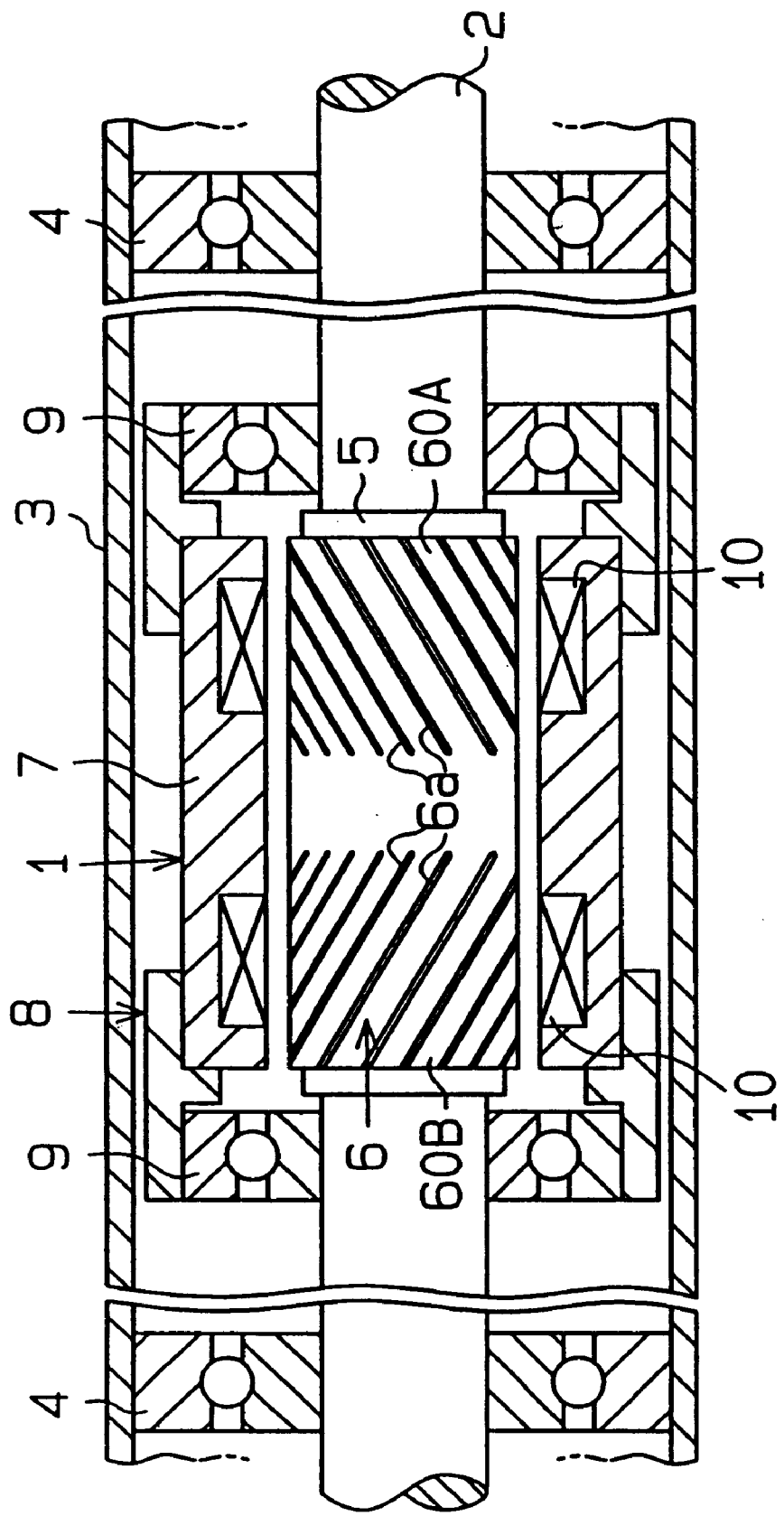
FIG. 1 is a cross-sectional view showing a torque sensor according to a first embodiment of the present invention.

As shown in FIG. 1, a shaft 2 is rotatably supported by bearings 4 inside the housing 3. A magnetostrictive portion 6 is welded on the periphery of a sleeve 5. The sleeve 5 is fitted on the shaft 2. Accordingly, the magnetostrictive portion 6 rotates integrally with the shaft 2.

The magnetostrictive portion 6 is a soft magnetic member with high permeability. For example, Ni Span C (made by Hitachi Metals Ltd.), permalloy, iron-nickel-chrome alloy, iron-aluminum magnetostrictive members, and amorphous magnetostrictive members can be used. Areas 60A, 60B are formed on the surface of the magnetostrictive portion 6. Grooves 6a inclined forty-five degrees relative to the axis and grooves 6a inclined minus forty-five degrees are formed on the areas 60A, 60B respectively. The grooves 6a are spaced apart at equal intervals in the circumferential direction.

Two bearings 9 are press-fitted on the periphery of the shaft 2 adjacent to both ends of the magnetostrictive portion. The two bearings 9 support a cylinder 7 by stators 8. In other words, the cylinder 7 is supported to cover the magnetostrictive portion 6 and to rotate with respect to the magnetostrictive portion 6. Two grooves, which face the areas 60A, 60B, are formed on the inner surface of the cylinder 7. An excitation coil 10 coiled in the circumferential direction of the shaft 2 is accommodated in each groove. In a torque sensor 1 of this construction, the cylinder 7 and the magnetostrictive portion are concentric even when the shaft 2 and the housing 3 are eccentric.

Figure 2:
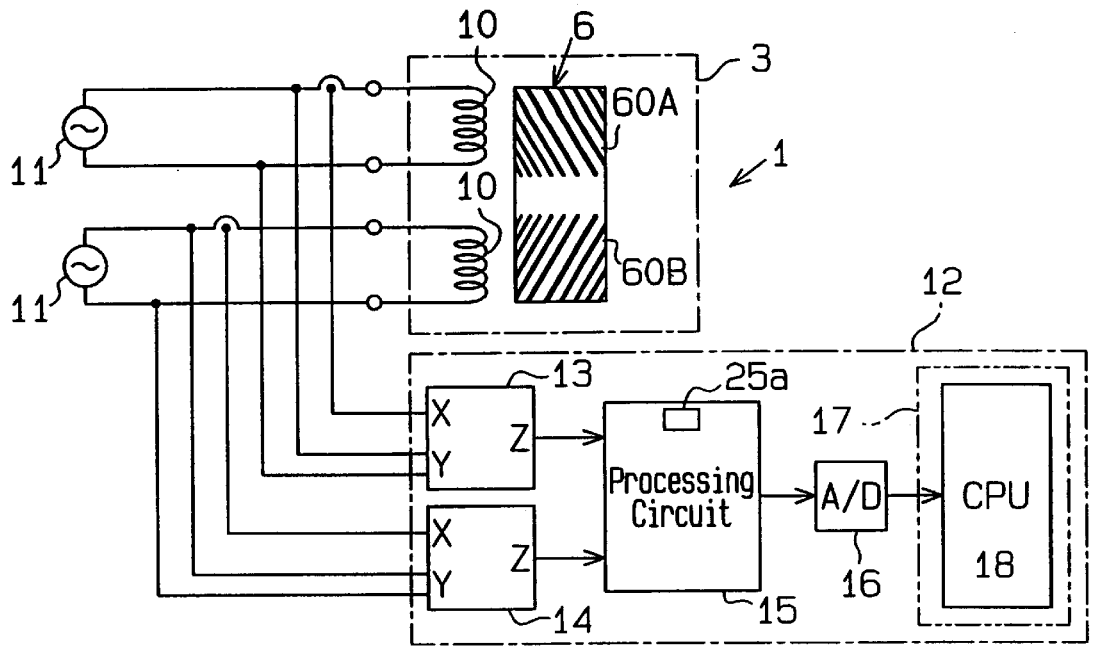
FIG. 2 is an electric circuit of a torque sensor of FIG. 1.

FIG. 2 shows an electric circuit of the torque sensor 1. The coil 10 is connected to an alternating current power source 11. A controller 12 controls an alternating current, which flows from the power source 11 to the coil 10 and has a predetermined frequency. A circuit formed by the power source 11 and the coil 10 is connected to alternating current multipliers 13, 14 provided in the controller 12. The alternating current flowing in the coil 10 is input as a signal X through the two input terminals of the multipliers 13, 14. The voltage applied to the coil 10 is input as a signal Y through the two input terminals of the multipliers 13, 14.

The multipliers 13, 14 multiply the corresponding input values X, Y, and multiplied values Z are output from the output terminals. Each input value X, Y is an effective value of the current and voltage, respectively, in the corresponding coil 10, and the multiplied value Z corresponds to the effective power of the coil 10. The output from the multipliers 13, 14 is input to a processing circuit 15.

Effective power P, alternating current I, and alternating voltage V are expressed as $P=IV\cos\phi$. I and V are effective values. When torque is applied to the shaft 2, the magnetostrictive portion 6 is strained and the permeability of the areas 60A, 60B changes according to the strain. This change affects the flux passing through the areas 60A, 60B and changes the impedance Z10 of the coil 10 seen from the power source. The change of impedance Z10 indicates a change of phase difference $\phi$ between the alternating current I and the alternating voltage V, that is, a change of electric power P. In this way, torque variations change the power P. An output value Z corresponding to the power is converted to a signal corresponding to torque by the circuit 15.

The processing circuit 15 of FIG. 2 has a differential circuit 15a. The differential circuit 15a performs subtraction to obtain the difference between the power values input from the multipliers 14, 15. The value resulting from the subtraction is input to the CPU 18 of the microcomputer 17 through the A/D converter 16. The CPU 18 calculates the direction and magnitude of torque based on the level of the input signal.

An operation of the torque sensor 1 will now be described.

When an alternating current with a predetermined frequency flows in the coils 10, the coils 10 generate magnetic fluxes. The fluxes form magnetic circuits going through the cylinder 7 and the magnetostrictive portion 6. The magnetic circuits include two magnetic circuits. One goes through the area 60A and the other goes through the area 60B. The fluxes go through the areas 60A, 60B in an angular direction of 45 degrees or minus 45 degrees along the strip-shaped areas between the grooves 6a.

When torque is applied on the shaft 2, compressive force is applied on one of the areas 60A, 60B in accordance with the rotation direction of the shaft 2 and tensile force is applied on the other area. The permeability of the magnetostrictive portion is greater when tensile force is applied and smaller when compressive force is applied. Therefore, the impedance Z10 of the coil 10 seen from the power source is greater where the tensile force is applied and smaller where the compressive force is applied. Suppose, for example, the phase difference $\phi$ between a current I and a voltage V is $\phi_0$ when there is no strain $\epsilon$ ($\epsilon=0$). When strained ($\epsilon>0$), the phase differences $\phi$ increases to $\phi=\phi_0+\theta$. When compressed ($\epsilon<0$), the phase difference decreases to $\phi=\phi_0-\theta$ ($\theta>0$).

Accordingly, output values $P_1$, $P_2$ are as follows. $P_1=I_1V_1\cos(\phi_0+\theta)$. $P_2=I_2V_2\cos(\phi_0-\theta)$. The differential circuit 15a performs subtraction ($P_1-P_2$), and the subtracted signal is input in the CPU 18 through the A/D converter 16. A ROM (not shown) in the computer 17 stores a reference value that corresponds to a state when the magnetostrictive portion is not strained, that is, when torque is null. The CPU 18 calculates the difference between the input value from the A/D converter and the reference value in the ROM and then calculates the direction and magnitude of torque based on the sign and magnitude of the difference value.

The first embodiment has the following advantages.

Torque of shaft 2 is detected by measuring the change of electric power in the circuit including the excitation circuit 10 and the alternating current power source 11. Accordingly, there is no need for a detection coil which was necessary in the prior art and only the excitation coil 10 is enough. Also, since torque is measured by measuring the change of electric power, the troublesome detection of the phase difference $\phi$ is unnecessary. Therefore, torque is measured by a circuit of simple construction.

A second embodiment of the present invention will now be described in reference to FIG. 3.

In a torque sensor 1 of the second embodiment, only an electric circuit is different from that of the first embodiment. Therefore, like numerals are used to refer to a like portions without explanation and different portions are described in detail.

Figure 3:
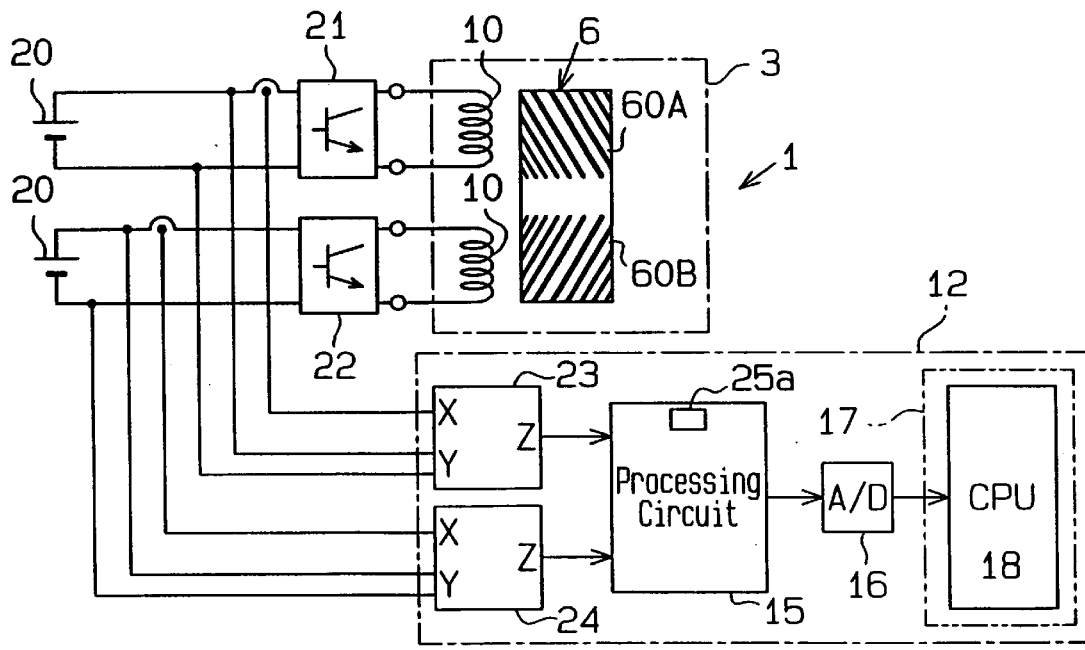
FIG. 3 is an electric circuit of a torque sensor according to a second embodiment of the present invention.

As shown in FIG. 3, a direct current (DC) power source 20 is used in a torque sensor of the second embodiment. Inverters 21, 22 are provided to convert the direct current into an alternating current (AC) with a predetermined frequency. The coils 10 are respectively connected to the inverters 21, 22. Connecting points between the DC power source and the inverters 21, 22 are connected to a controller 12. The controller 12 includes multipliers 23, 24 for direct currents. The multipliers 23, 24 respectively multiplies two kinds of input values X, Y and output the multiplied values Z (XY).

The direct current flowing through each connecting point and the DC voltage applied to each connecting point are input in the multipliers 23, 24. The multipliers 23, 24 calculate the electric power in a direct current stage (between DC power sources and the inverters 21, 22) and output a value corresponding to the calculated electric power. The output values from the multipliers 23, 24 are input in a processing circuit 25.

The power P is expressed as $P=IV$. I indicates a DC current and V indicates a DC voltage. When torque is applied to the shaft 2, the areas 60A, 60B of the magnetostrictive portion are strained, the flux changes according to the strain, and the impedance Z10 of coil 10 seen from the power source side changes. The change of impedance Z10 shows the change of phase difference $\phi$ in the alternating current stage, which is between the inverters 21, 22 and the coils 10, that is, the change of impedance appears as a change in electric power P. Since the change of the power P in the alternating current stage causes a power change in the direct current stage, the power P in the direct current stage changes according to the change of impedance Z10. Therefore, torque variations change the power P in the direct current stage.

The circuit 25 converts a signal based on the power P in the direct current stage into a signal corresponding to torque. Subtraction is performed to obtain the difference between the power values from the multipliers 23, 24 in the differential circuit 25a of the circuit 25. A signal representing the resulting difference is input to the CPU 18 of the microcomputer 17 through the A/D converter 16. The CPU 18 calculates the direction and magnitude of the torque based on the level of the input signal.

When an alternating current with a predetermined frequency flows in the coil 10, the coil 10 generates flux. The flux forms magnetic circuits passing through the cylinder 7 and the magnetostrictive portion 6. There are two magnetic circuits. One passes through the area 60A of the magnetostrictive portion, and the other passes through the area 60B. The flux passed through the areas 60A, 60B at an angular direction of 45 degrees or minus 45 degrees along the strip-shaped areas between the grooves 6a.

When torque is applied on the shaft 2, compressive force acts on either one of the areas 60A, 60B and tensile force acts on the other, according to the direction of the applied torque. In the magnetostrictive portion, permeability is larger when tensile force is applied and smaller when compressive force is applied. Therefore, the impedance seen from the power source is larger for the coil corresponding to area on which tension is applied and smaller for the coil corresponding to area on which compression is applied.

Suppose, for example, the phase difference $\phi$ is $\phi_0$ when there is no strain ($\epsilon=0$). The phase difference $\phi$ increases to $\phi=\phi_0+\theta$ when strained ($\epsilon>0$) and decreases to $\phi=\phi_0-\theta$ (provided that $\theta>0$) when compressed ($\epsilon<0$). The change of the phase changes the power in the alternating current stage and the power in the direct current stage. In the second embodiment, the voltage V constant and the change of impedance appears as a change in the direct current I. When the impedance is greater, the direct current I decreases to $I=I-\alpha$. When the impedance is smaller, the direct current I increases to $I=I+\alpha$ (provided that $\alpha>0$).

Accordingly, the output values $P_3$, $P_4$ from the multipliers 23, 24 are $P_3=(I_3-\alpha)V_3$ and $P_4=(I_4+\alpha)V_4$. The differential circuit 25a performs subtraction $(P_3-P_4)$ and obtains the difference between the two output values. The resulting difference signal is input to the computer 17 through the A/D converter 16. A ROM (not shown) of the CPU 18 stores a reference value corresponding to zero torque, where the magnetostrictive portion is not strained. The CPU 18 calculates the difference between the input value and the reference value and obtains the direction and magnitude of torque based on the sign and magnitude of the resulting difference value.

The second embodiment has the following advantages.

Since torque is detected by measuring the change of power in the electric circuit including the excitation coil 10 and the DC power source 20, the detection coil of the prior art is unnecessary. Only the excitation coil 10 is necessary. Also, since torque is measured by measuring the change of power, the troublesome detection of phase difference $\phi$ is unnecessary. Therefore, torque is measured by a circuit of simple construction.

Torque is measured by measuring the change of power in the direct current stage. Unlike a circuit for measuring AC power, it is not necessary to take into consideration the time change in a circuit for measuring power. Accordingly, torque is measured by a circuit having a construction that is simpler than that of the first embodiment.

A third embodiment of the present invention will now be described in reference to FIG. 4.

In the third embodiment, only the electric circuit is different. Similar numerals are used for the similar portions without description and different portions are explained in detail.

In short, in the third embodiment, the phase difference $\phi$ is measured using detection signals based on the voltage and current of each circuit including the AC power source 11 and the excitation coil 10. Torque is detected based on the power change obtained from the phase differences.

Figure 4:
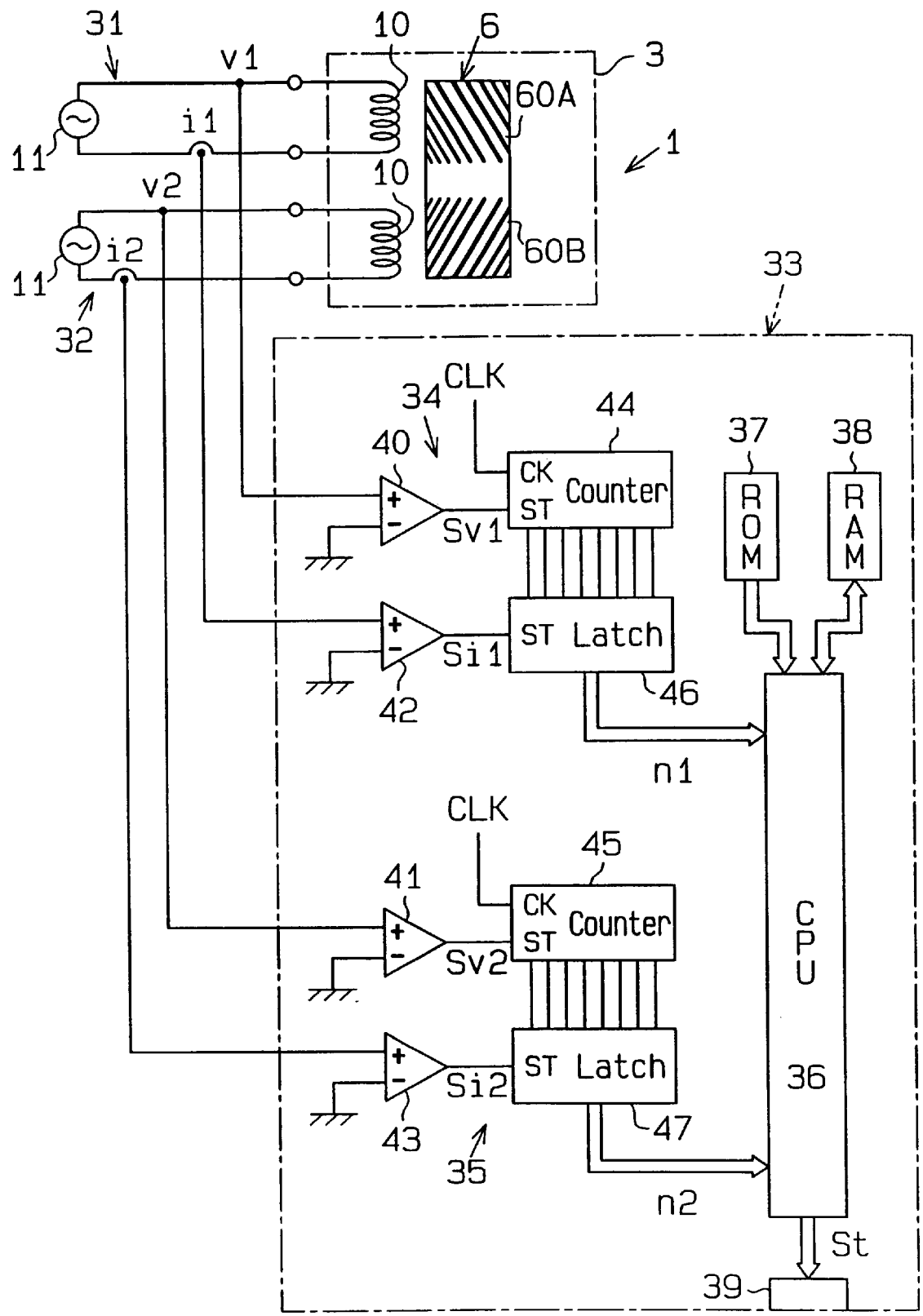
FIG. 4 is an electric circuit of a torque sensor according to a third embodiment of the present invention.

FIG. 4 shows an electric circuit of torque sensor 1. The torque sensor 1 includes the excitation circuits 31, 32 and the processing circuit 33. The excitation circuits 31, 32 respectively include the excitation coil 10 and the AC power source 11. The processing circuit 33 generates a signal corresponding to torque from a detection signal based on the voltage v and current i in the excitation circuits 31, 32. The processing circuit 33 includes timing circuits 34, 35 in the circuits 31, 32, a CPU (central processing unit) 36, a ROM (read only memory) 37, a RAM (random access memory) 38 and an output port 39.

The two timing circuits share the same construction. The first timing circuit 34 includes first and second comparators 40, 42 connected to a first excitation circuit 31, an N number notation counter 44, an M bit latch 46 connected to the second comparator 40. The second timing circuit 35 includes an N number notation counter 45 connected to the first comparator 41 and an M bit latch 47 connected to the second comparator 43.

In the first timing circuit 34, a voltage v1 and current i1 of the first excitation circuit 31 are respectively input to non-inverting input terminals of the first and second comparators 40, 42. In the second timing circuit 35, a voltage v2 and current i2 of the second excitation circuit 32 are respectively input to non-inverting input terminals of the first and second comparators 41, 43.

Figure 5:
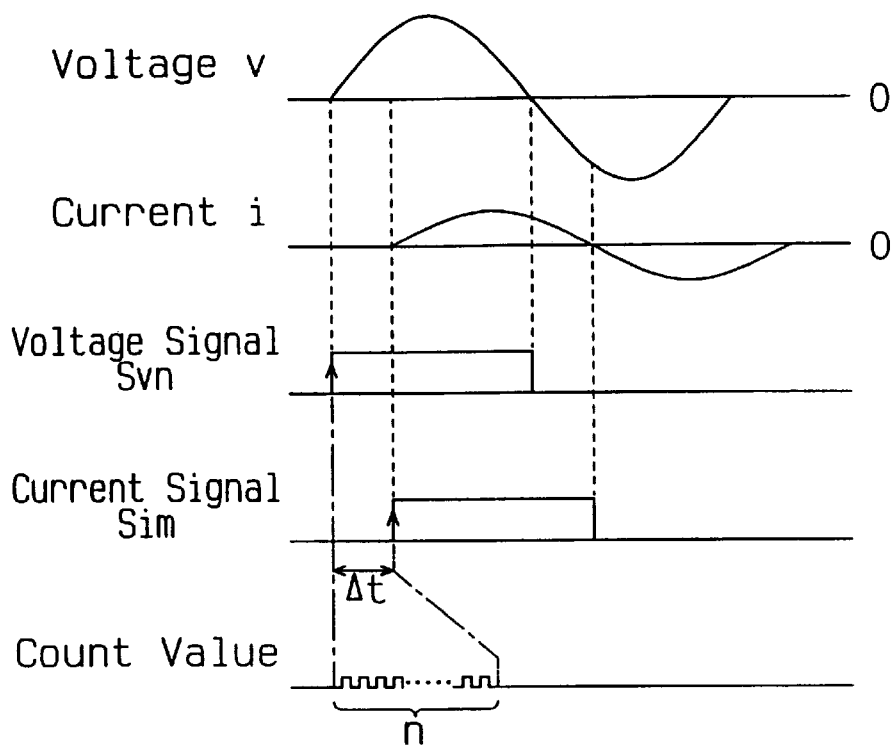
FIG. 5 shows signal waveforms of a torque sensor of FIG. 4.

The reference voltage of the four comparators 40–43 is null. As shown in FIG. 5, rectangular wave signals (voltage signals) Svn (n=1, 2) are output from the output terminals of the first comparators 40, 41. Each rectangular wave signal Svn has the same phase as the voltage of the corresponding excitation circuit 31 of 32. Also, rectangular wave signals (current signals) Sim (m=1, 2) are output from the output terminals of the second comparators 42, 43. Each rectangular signal Sim has the same phase as the current i of the corresponding excitation circuit 31 or 32. The time difference between the rise points of the voltage signal Svn and the current signal Sim equals the phase difference $\Delta t$ between the voltage v and the current i.

The counters 44, 45 receive a standard clock signal CLK at their CK terminals. The standard clock signal CLK is sent from a clock generator (not shown) built in the CPU 36 and has a frequency $F_0$ (for example, $F_0=1$ to 10 MHz). Also, the ST terminals of the counters 44, 45 are connected to the output terminals of the first comparators 40, 41. Each counter 44, 45 starts counting the pulses of the standard clock signal CLK when the signal input to the corresponding ST terminal rises up to the H level. When the input signal goes down to L level, the corresponding counter 44, 45 is reset. When the signal input to each ST terminal rises to H level, the corresponding latch 46, 47 inputs and retains the counted data (count value) from the corresponding counter 44, 45. As shown in FIG. 5, a count value n corresponding to the phase difference $\Delta t$ between the voltage v and the current i is retained. The latches 46, 47 are connected to the CPU 36.

A ROM 37 stores a program for obtaining torque by processing. The CPU 36 calculates torque at a predetermined time interval using the program. Further, the ROM 37 stores a conversion table for converting the phase difference φ calculated from the count value n into a value of cosφ.

Figure 6:
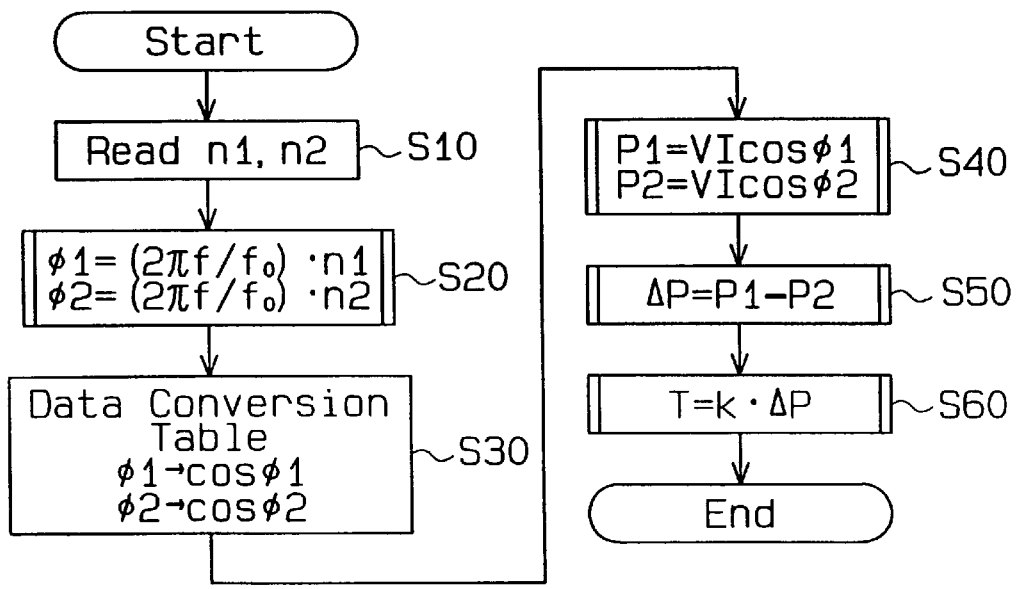
FIG. 6 is a flowchart showing torque detection process of a torque sensor of FIG. 4.

An outline of the program is shown by the flowchart of FIG. 6. At step S10, the CPU 36 reads the count value n1, n2 retained in the latch 46, 47. At step S20, the CPU 36 calculates phase differences $\phi_1$, $\phi_2$ between the voltage v and the current i in the circuits 31, 32. In the program, f is a frequency of the AC power source 11 and $f_0$ is a frequency of standard clock signal CLK. At step S30, $\cos\phi_1$, $\cos\phi_2$ are calculated from the phase differences $\phi_1$, $\phi_2$ using the data conversion table.

At step 40, the electric power values $P_1$, $P_2$ of each circuit 31, 32 are calculated using the expression P=IVcosφ. At step S50, the power difference $\Delta P=P_1-P_2$ is calculated. At step S60, the CPU 36 calculates a torque detection value T based on the power difference ΔP using an expression T=kΔP (provided that k is a proportional constant). The CPU 36 outputs a detection signal St corresponding to the torque detection value T to the output port 39. The detection signal St is based on the direction and magnitude of the torque. The reason for detecting torque based on the power difference P in the circuits 31, 32 is as follows. The power in each circuit 31, 32 changes according to the torque. When the torque is calculated based on the addition of the absolute value of the changed amount, the sensitivity of torque detection improves.

The operation of the torque sensor 1 will now be described.

Two kinds of magnetic circuits are formed in the two areas 60A, 60B of the magnetostrictive portion 6 when an alternating current with frequency f flows in the excitation coils 10. A flux passing through each magnetic circuit is inclined 45 degrees or minus 45 degrees relative to the axis.

When torque is applied to the shaft 2, a compressive force acts on one of the areas 60A, 60B and a tensile force acts on the other, in accordance with the direction of the applied torque. The permeability of the magnetostrictive portion 6 is greater when strained and smaller when compressed. Therefore, the impedance of coils 10 seen from the power source is greater on the side corresponding to the strained area and smaller on the side corresponding to the compressed side.

Accordingly, compared to the phase difference $\phi=\phi_0+\theta$ between the current i and the voltage v when there is no strain ε (ε=0), the phase difference φ increases to $\phi=\phi_0+\theta$ when strained (ε>0) and decreases to $\phi=\phi_0-\theta$ when compressed (ε<0, θ>0). The change of impedance Z10 indicates the change of phase difference φ.

In the third embodiment, the timing circuits 34, 35 measure a phase difference Δt between the phase of the voltage v and the phase of the current i in the excitation circuits 31, 32. The first comparators 40, 41 output voltage signals Sv1, Sv2 based on the phases of the voltages v1, v2. The counters 44, 45 start counting at the rise points of the signals Sv1, Sv2. On the other hand, the comparators 42, 43 output current signals Si based the phases of the currents i1, i2. The latches 46, 47 retain the count values n1, n2 of the counters 44, 45 when the current signals Si are input. The latch 46 retains the phase difference Δt between the voltage v1 and the current i1 in the circuit 31 as the count value n1. The latch 47 retains the phase difference Δt between the voltage v2 and the current i2 in the circuit 32 as the count value n2.

The CPU 36 reads (S10) the count values n1, n2 from the latches 46, 47 at a predetermined time interval, executes step 20 through step 60, and then calculates the torque detection value T using the data n1, n2. The CPU 36 calculates (S20) the phase differences $\phi_1$, $\phi_2$ based on the count value n1, n2 and calculates (S30, S40) the power $P_1$, $P_2$ of the circuits 31, 32 based on the phase differences $\phi_1$, $\phi_2$. Subsequently, the CPU 36 calculates (S50) the difference ΔP between the power $P_1$, $P_2$ and calculates (S60) a torque detection value T from the power difference ΔP. A torque detection signal St corresponding to the torque detection value T obtained from a series of calculations is output to the output port 39 and is transferred to an external control circuit through a signal line.

The third embodiment has the following advantages.

Since torque is detected by measuring the change of power in the circuits 31, 32 including the excitation coil 10 and the AC power source 11, there is no need for the detection coil of the prior art, which simplifies the construction of the torque sensor.

The timing circuits 34, 35 output digital signals to the CPU 36. Therefore, the CPU 36 directly calculates the signals and there is no need for the troublesome adjustment that is required when using analog circuits.

The present invention is not limited to the above embodiments. It may be embodied as follows.

Figure 7:
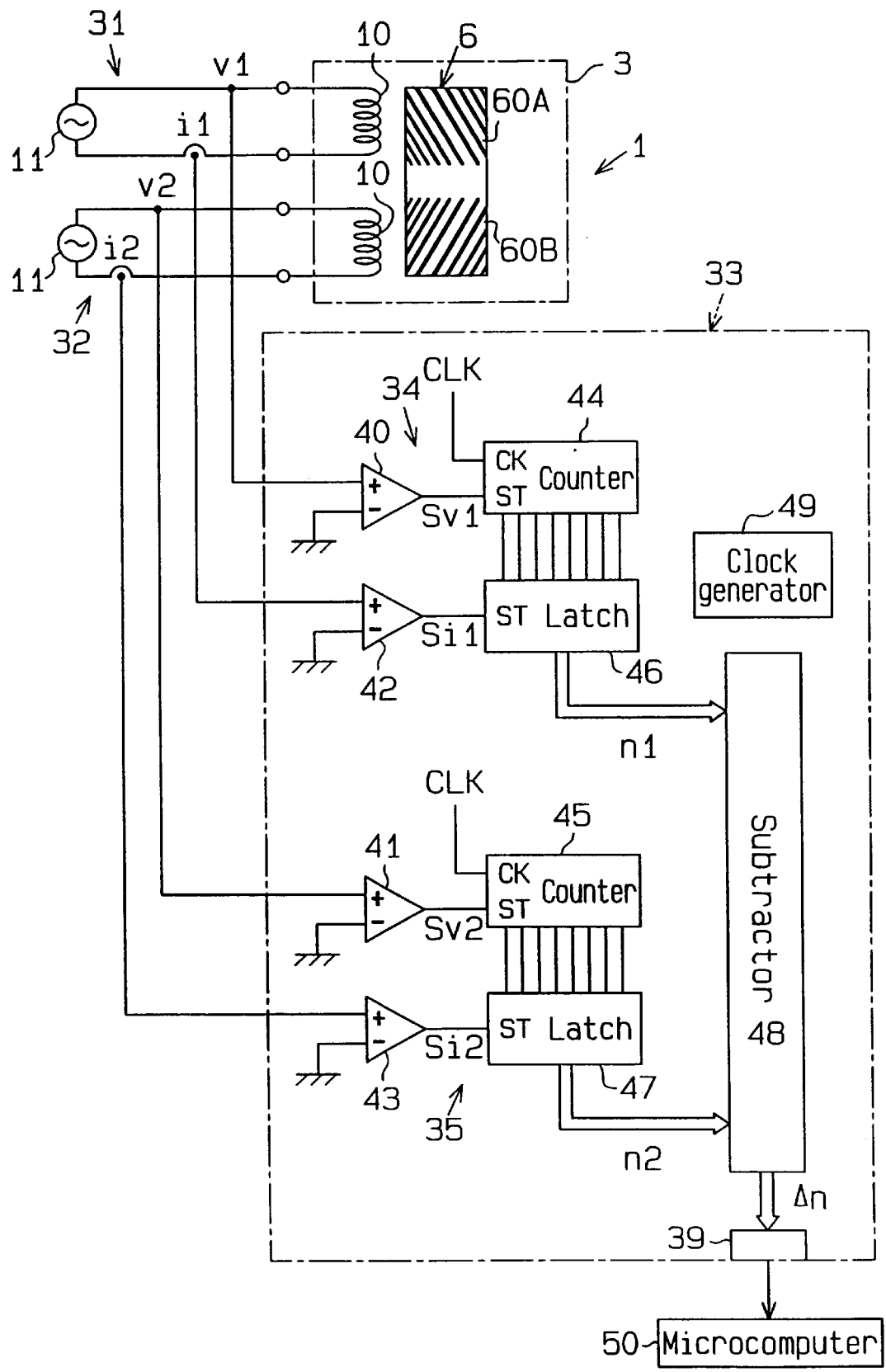
FIG. 7 is an electric circuit of a torque sensor according to a further embodiment of FIG. 4.
Figure 8:
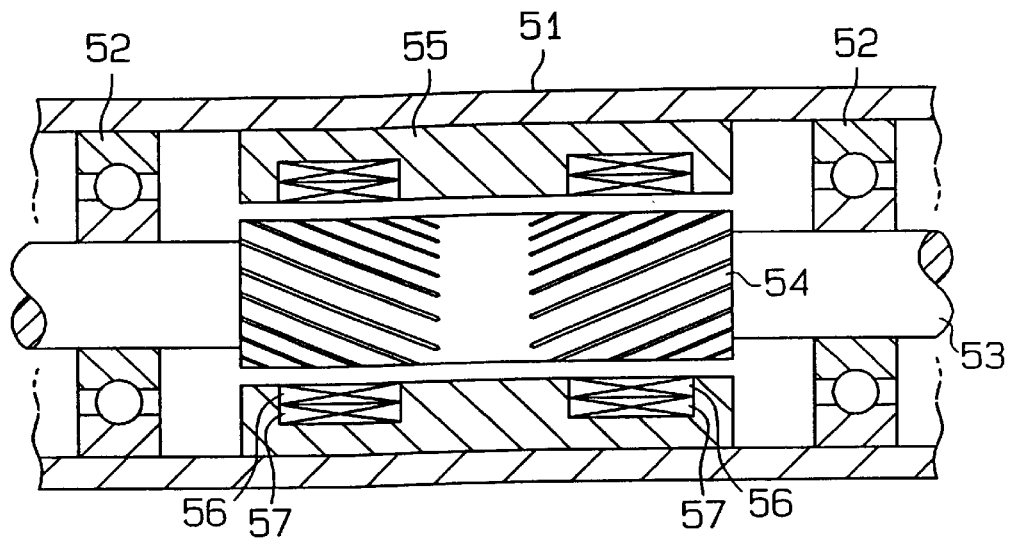
FIG. 8 is a cross-sectional view of a conventional torque sensor.
Figure 9:
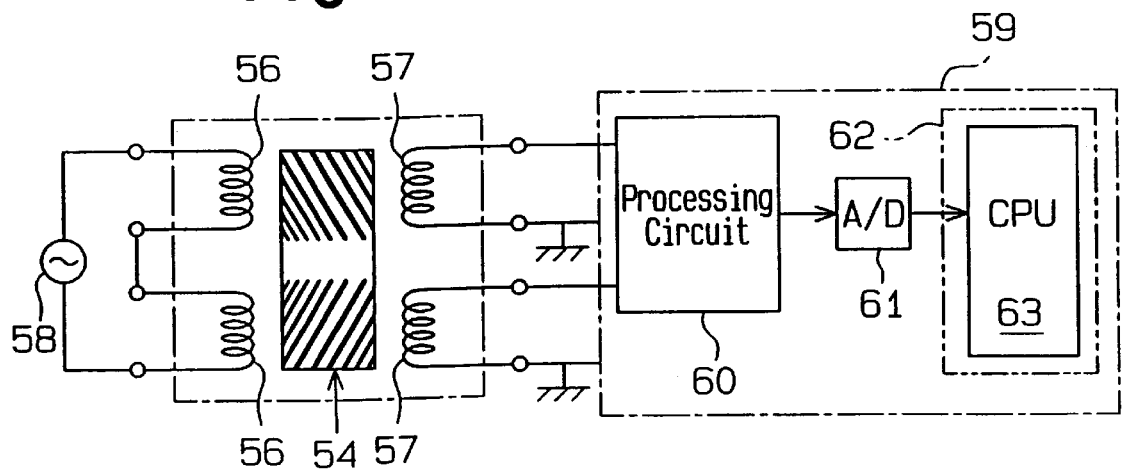
FIG. 9 is an electric circuit of a conventional torque sensor.

In the third embodiment, electric power may not actually be calculated. As shown in FIG. 7, a subtractor 48 may be employed instead of the CPU 36, with an independent clock generator 49 outputting the standard clock signal CLK to the counters 44, 45. In this case, the subtractor 48 subtracts the count value n2 from n1, outputting the difference value Δn (n1−n2) to the output port 39. The difference value Δn is a count value corresponding to the addition of a delay time Δt1 of a circuit (31 or 32) delaying in phase and an advance time Δt2 of a circuit (31 or 32) advancing in phase. The difference value Δn has a one-to-one correspondence with the torque applied on the shaft 2. Data based on the input value Δn may be sent to an external microcomputer 50 connected to the output port of the torque sensor 1 and the torque detection value T may be calculated therein. The program of FIG. 6 may be executed by the external microcomputer 50 and electric power may be calculated therein. In this case, Δn/2 is used as n1, n2. Then, the torque detection value T is obtained from the calculated power.

Also, in the third embodiment, relational expressions or tables of torque and Δn obtained in advance experiments may be stored in the ROM 37 and torque detection value T may be obtained using the relational expressions and tables, without actually calculating the power from Δn. Further, in the processing circuit of FIG. 7, the subtracter 48 may be omitted and the data n1, n2 of the latches 46, 47 may be directly output to the output port 39 and then the microcomputer 50 may execute the program of FIG. 6.

In short, since the phase difference and the torque value have a one-to-one correspondence, the phase difference data may be processed into any value as long as it has a one-to-one correspondence with the torque. However, it is preferable that the torque sensor output one kind of detection signal to inevitably determine a torque value rather than to output several kinds of detection signals.

In the third embodiment, the output signals of the comparators 40–43 need not necessarily be in the same phase as the voltage v and the current i. The output signals should have a count value that has a one-to-one correspondence with the phase difference Δt. The reference voltage of the comparators may be other than zero.

In the third embodiment, a PLL (phase locked loop) may be used to measure the phase difference Δt.

In the second embodiment, signals based on the current and voltage in the alternating current stage may be input to multipliers for alternating current, and torque may be calculated by calculating an effective power as in the first embodiment. The torque sensor is not be limited to a magnetostrictive type. Inductance type sensors may be employed.

In the second embodiment, torque may be measured by measuring the change of the DC current I, as long as the voltage is constant. That is, signals corresponding to the currents I in the direct current stage are input to a differential circuit, which subtracts one from the other. The resulting difference signal is input to the CPU through the A/D converter. The CPU compares the input value with the reference value and calculates torque direction and torque magnitude. In this construction, multipliers are not necessary. However, when the voltage changes by the capacity change of the DC current (for example, when batteries are used), the precision of detection is more likely to degrade in comparison with the construction of the second embodiment.

In any of the above embodiments, the output values from the two multipliers may be input to the CPU through the A/D converter, and then subtraction is performed by the CPU.

An AC current flowing in the excitation coil may be a rectangular wave, sine wave, or pulse width modulation wave, as long as it is an AC current with a frequency.

The grooves 6a on the surface of the magnetostrictive portion 6 may be omitted and a crosshead type pickup may be employed to detect the change of flux.

In all of the above embodiments, two coils 10 are provided on one magnetostrictive portion 6, however, torque may be detected by only one coil 10 when high precision of detection is not required.

It should be apparent to those skilled in the art that the present invention may be embodied in many other specific forms without departing from the spirit or scope of the invention. Therefore, the present examples and embodiments are to be considered as illustrative and not restrictive and the invention is not to be limited to the details given herein, but may be modified within the scope and equivalence of the appended claims.

What is claimed is:

1. A torque sensor connected to a shaft to detect torque applied to the shaft, the torque sensor comprising:
   a magnetic portion attached to the shaft;
   a retainer surrounding the magnetic portion and supported such that the magnetic portion rotates with respect to the retainer;
   a coil retained in the retainer for forming a magnetic circuit passing through the magnetic portion, wherein the coil surrounds the magnetic portion;
   a power source for applying an alternating voltage to the coil; and
   a measuring circuit for measuring the power supplied to the coil, the measured power being indicative of the torque applied to the shaft.

2. The torque sensor according to claim 1, wherein the coil is a first coil and the magnetic circuit is a first magnetic circuit, the torque sensor further comprising a second coil retained in the retainer near the first coil, wherein an alternating voltage is applied to the second coil for forming a second magnetic circuit passing through the magnetic portion.

3. The torque sensor according to claim 2, wherein a magnetic property of the magnetic portion changes according to torque applied on the shaft, and wherein the magnetic property affects the power characteristics of each coil.

4. The torque sensor according to claim 2, wherein the torque sensor includes:
   a current detector for detecting the current flowing in each coil;
   a voltage detector for detecting the voltage applied to each coil; and
   a converter for converting the detected currents and voltages into a value corresponding to the torque applied to the shaft.

5. The torque sensor according to claim 2, wherein the torque sensor includes a phase detector for detecting the phase difference between the voltage and the current of each coil, respectively.

6. A torque sensor connected to a shaft to detect torque applied to the shaft, the torque sensor comprising:
   a magnetic portion attached to the shaft;
   a retainer surrounding the magnetic portion and supported such that the magnetic portion rotates with respect to the retainer;
   a coil retained in the retainer for forming a magnetic circuit passing through the magnetic portion, wherein the coil surrounds the magnetic portion;
   a power source for applying an alternating voltage to the coil; and
   a measuring circuit for measuring the torque applied to the shaft based on the power supplied to the coil;
   a second coil retained in the retainer near said coil, wherein an alternating voltage is applied to the second coil for forming a second magnetic circuit passing through the magnetic portion;
   a phase detector for detecting the phase difference between the voltage and the current of each coil, respectively, the phase detector including
      a first voltage comparator outputting a signal corresponding to the voltage phase of the first coil;
      a first current comparator outputting a signal corresponding to the current phase of the first coil;
      a second voltage comparator outputting a signal corresponding to the voltage phase of the second coil;
      a second current comparator outputting a signal corresponding to the current phase of the second coil;
      a first counter circuit measuring time from the rising point of the signal output from the first voltage comparator to a rising point of the signal output from the first current comparator; and
      a second counter circuit measuring time from the rising point of the signal output from the second voltage comparator to a rising point of the signal output from the second current comparator.

7. The torque sensor according to claim 6, wherein each counter circuit includes a latch circuit for storing the measured time.

8. The torque sensor according to claim 7, wherein the torque sensor includes a converter for converting the measured times into a value corresponding to the torque applied to the shaft, the converter including a CPU for calculating the magnitude of the torque applied to the shaft based on the times measured by the counter circuits.

9. The torque sensor according to claim 8, wherein the CPU outputs a clock signal with a predetermined frequency to the counter circuits.

10. The torque sensor according to claim 2, wherein the measuring circuit includes a power detector for detecting the power supplied to each coil.

11. A torque sensor connected to a shaft to detect torque applied to the shaft, the torque sensor comprising:

a magnetic portion attached to the shaft;

a retainer surrounding the magnetic portion and supported such that the magnetic portion rotates with respect to the retainer;

a coil retained in the retainer for forming a magnetic circuit passing through the magnetic portion, wherein the coil surrounds the magnetic portion;

a power source for applying an alternating voltage to the coil; and a measuring circuit for measuring the torque applied to the shaft based on the power supplied to the coil;

a second coil retained in the retainer near said coil, wherein an alternating voltage is applied to the second coil for forming a second magnetic circuit passing through the magnetic portion;

the measuring circuit including a power detector having a first multiplier for calculating the power corresponding to said coil based on the current and the voltage supplied to said coil and a second multiplier for calculating the power corresponding to the second coil based on the current and the voltage supplied to the second coil.

12. The torque sensor according to claim 11, wherein the converter includes a differential circuit for subtracting a value, which is provided by the first multiplier, representing the power supplied from the first coil, from a value, which is provided by the second multiplier, representing the power supplied to the second coil.

13. The torque sensor according to claim 12, wherein the converter includes a CPU for calculating the magnitude of the torque applied to the shaft based on the output from the differential circuit.

14. The torque sensor according to claim 2, wherein a magnetic property of the magnetic portion changes according to the torque applied to the shaft, the magnetic portion having a first part and a second part, the first part being different from and axially spaced from the second part, wherein the first coil is radially spaced from the first part, and the second coil is radially spaced from the second part.

15. A torque sensor connected to a shaft for detecting the direction and magnitude of torque applied on the shaft, the torque sensor comprising:

a magnetic portion fixed to the shaft, wherein a magnetic property of the magnetic portion changes according to the torque applied to the shaft, the magnetic portion having a first part and a second part, the first part being axially spaced from the second part;

a retainer surrounding the magnetic portion, wherein the shaft rotates with respect to the retainer;

a first coil supported by the retainer to form a first magnetic circuit passing through the first part of the magnetic portion;

a second coil supported by the retainer to form a second magnetic circuit passing through the second part of the magnetic portion;

a first alternating power source for powering the first coil;

a second alternating power source for powering the second coil;

a first power detector for detecting the power supplied to the first coil;

a second power detector for detecting the power supplied to the second coil;

a processor for calculating the torque applied to the shaft based on the difference between the power supplied to the first coil and the power supplied to the second coil.

16. The torque sensor according to claim 15, wherein the first power detector includes a first counter, and the second power detector includes a second counter.

17. A torque sensor connected to a shaft for detecting the direction and magnitude of torque applied on the shaft, the torque sensor comprising:

a magnetic portion fixed to the shaft, wherein a magnetic property of the magnetic portion changes according to the torque applied to the shaft, the magnetic portion having a first part and a second part, the first part being axially from the second part;

a retainer surrounding the magnetic portion, wherein the shaft rotates with respect to the retainer;

a first coil supported by the retainer to form a first magnetic circuit passing through the first part of the magnetic portion;

a second coil supported by the retainer to form a second magnetic circuit passing through the second part of the magnetic portion;

a first alternating power source for powering the first coil;

a second alternating power source for powering the second coil;

a first power detector for detecting the power supplied to the first coil;

a second power detector for detecting the power supplied to the second coil;

a processor for calculating the torque applied to the shaft based on the difference between the power supplied to the second coil;

the first power detector including a first phase difference detector for detecting the difference between the phase of the voltage and the phase of the current supplied to the first coil; and the second power detector including a second phase difference detector for detecting the difference between the phase of the voltage and the phase of the current supplied to the second coil.

18. The torque sensor according to claim 17, wherein the first counter includes:

a first voltage comparator for outputting a signal corresponding to the phase of the voltage of the first coil;

a first current comparator for outputting a signal corresponding to the phase of the current of the first coil;

a first counter circuit for measuring a first time period from a rising point of the signal output from the first voltage comparator to the rising point of a signal output from the first current comparator;

and the second counter includes:

a second voltage comparator for outputting a signal corresponding to the phase of the voltage of the second coil;

a second current comparator for outputting a signal corresponding to the phase of the current of the second coil; and a second counter circuit for measuring a second time period from a rising point of the signal output from the second voltage comparator to the rising point of a signal output from the second current comparator.

19. The torque sensor of claim 18, wherein the first counter circuit includes a first latch circuit for storing a first value representing the first time period and the second counter circuit includes a second latch circuit for storing a second value representing the second time period.

20. The torque sensor of claim 19, wherein the processor includes a CPU for calculating the magnitude of torque based on the first and second values.

21. The torque sensor according to claim 20, wherein the CPU outputs a clock signal with a predetermined frequency to each counter circuit.

22. A torque sensor connected to a shaft for detecting the direction and magnitude of torque applied on the shaft, the torque sensor comprising:

a magnetic portion fixed to the shaft, wherein a magnetic property of the magnetic portion changes according to the torque applied to the shaft, the magnetic portion having a first part and a second part, the first part being axially spaced from the second part;

a retainer surrounding the magnetic portion, wherein the shaft rotates with respect to the retainer;

a first coil supported by the retainer to form a first magnetic circuit passing through the first part of the magnetic portion;

a second coil supported by the retainer to form a second magnetic circuit passing through the second part of the magnetic portion;

a first direct current power source for powering the first coil;

a first inverter located between the first direct current power source and the first coil;

a second direct current power source for powering the second coil;

a second inverter located between the second direct current power source and the second coil;

a first power detector for detecting the power supplied to the first coil;

a second power detector for detecting the power supplied to the second coil;

a processor for calculating the torque applied to the shaft based on the difference between the power supplied to the first coil and the power supplied to the second coil.

23. The torque sensor according to claim 22, wherein the first power detector includes a first multiplier for calculating a first power value representing the power supplied to the first coil based on the current and voltage applied to the first coil and a second multiplier for calculating a second power value representing the power supplied to the second coil based on the current and voltage applied to the second coil.

24. The torque sensor according to claim 23, wherein the processor includes a differential circuit for determining a value representing the difference between the first power value and the second power value.

25. The torque sensor according to claim 24, wherein the processor includes a CPU for calculating the magnitude of the torque applied to the shaft based on the output from the differential circuit.

26. A method for detecting the torque applied to a shaft having a magnetic portion attached the shaft and a retainer that surrounds the magnetic portion for rotation with respect thereto, the method comprising:

supporting a coil on the retainer so as to surround the magnetic portion and form a magnetic circuit passing through the magnetic portion;

exciting the coil with a power source; and measuring the power supplied to the coil from the power source, the measured power being indicative of the torque applied to the shaft.

27. The method of claim 26, wherein:

the voltage and current exciting the coil are detected; and power is measured by generating a signal proportional to the mathematical product of the detected current and voltage.

28. The method of claim 27, wherein the coil is excited by a direct current power source.

29. The method of claim 27, wherein the coil is excited by an alternating current power source.

30. The method of claim 26, wherein the step of measuring the power comprises:

detecting the difference between the electrical phases of the excitation voltage and current; and calculating a value proportional to the mathematical product of the voltage, current and cosine of the phase difference.

* * * * *

UNITED STATES PATENT AND TRADEMARK OFFICE
CERTIFICATE OF CORRECTION

PATENT NO. : 6,094,995  Page 1 of 1
DATED : August 1, 2000
INVENTOR(S) : Odachi et al.

It is certified that error appears in the above-identified patent and that said Letters Patent is hereby corrected as shown below:

Title page,
Item [73], Assignee, delete ";" after "Toyoda" and before "Jidoshokki"
Item [57], ABSTRACT, should read as follows:
-- A torque sensor for detecting the torque applied to a shaft. A magnetic element having two different parts is attached to the shaft, and a retainer, which is connected to the shaft, surrounds the magnetic element. The shaft is rotatable with respect to the retainer. A pair of electric coils are supported by the retainer to surround the shaft. One coil corresponds to each part of the magnetic element. Alternating current is supplied to the coils. Torque variations in the shaft change a magnetic property of the parts of the magnetic element. Variations in the magnetic property change the value of the power supplied to the corresponding coil. A measuring circuit is provided to measure the difference between the power supplied to one coil and the power supplied to the other. The magnitude and direction of the torque applied to the shaft is thus sensed by determining the difference between the power supplied to one coil and that supplied to the other. In one type of sensor, values representing the voltage and current supplied to each coil and multiplied to obtain a power value for each coil. In another type, the power values are determined by measuring the phase difference between the voltage and the current supplied to each coil. --

Column 2,
Line 13, "on current" should read -- on a current --

Column 6,
Line 9, "differences" should read -- difference ø --

Signed and Sealed this

First Day of April, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,094,995
DATED : August 1, 2000
INVENTOR(S) : Odachi et al.

It is certified that error appears in the above-identified patent and that said Letters Patent is hereby corrected as shown below:

Title page,
Item [73], Assignee, delete ";" after "Toyoda" and before "Jidoshokki"
Item [57], ABSTRACT, should read as follows:

-- A torque sensor for detecting the torque applied to a shaft. A magnetic element having two different parts is attached to the shaft, and a retainer, which is connected to the shaft, surrounds the magnetic element. The shaft is rotatable with respect to the retainer. A pair of electric coils are supported by the retainer to surround the shaft. one coil corresponds to each part of the magnetic element. Alternating current is supplied to the coils. Torque variations in the shaft change magnetic property of the parts of the magnetic element. Variations in the magnetic property change the value of the power supplied to the corresponding coil. A measuring circuit is provided to measure the difference between the power supplied to one coil and the power supplied to the other. The magnitude and direction of the torque applied to the shaft is thus sensed by determining the difference between the power supplied to one coil and that supplied to the other. In one type of sensor, values representing the voltage and current supplied to each coil and multiplied to obtain a power value for each coil. In another type, the power values are determined by measuring the phase difference between the voltage and the current supplied to each coil. --

Column 2,
Line 13, "on current" should read -- on a current --

Column 6,
Line 9, "differences" should read -- difference ø --

Signed and Sealed this

Fifteenth Day of April, 2003

JAMES E. ROGAN
*Director of the United States Patent and Trademark Office*